H. W. MOWER.
EXPANSION BOLT.
APPLICATION FILED FEB. 8, 1912.
1,033,447.
Patented July 23, 1912.
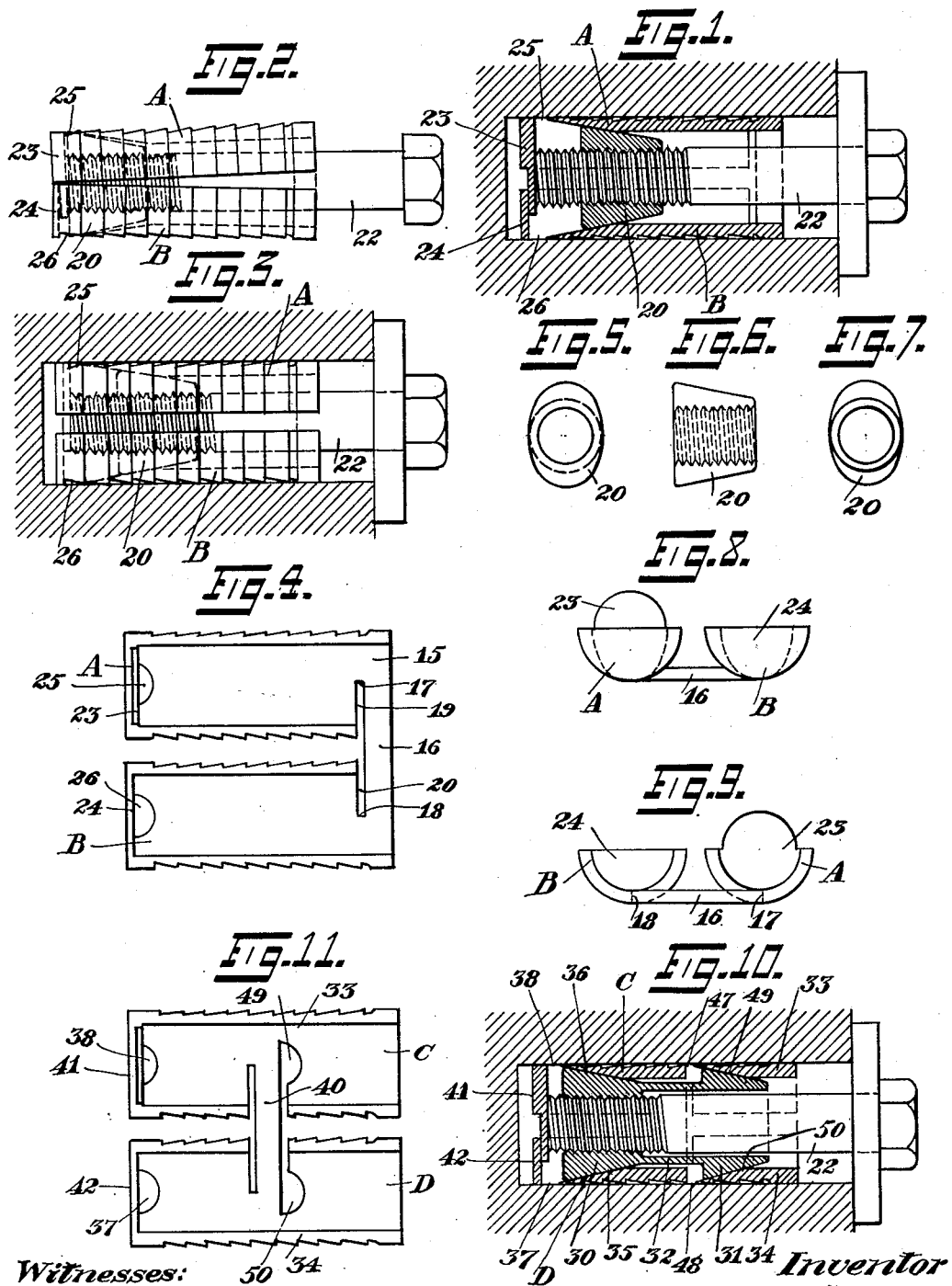
Witnesses:
Peter Henry
H. D. Penney
Inventor
Herbert W. Mower,
By his Attorney,
F. H. Richards

UNITED STATES PATENT OFFICE.

HERBERT W. MOWER, OF NEWARK, NEW JERSEY.

EXPANSION-BOLT.

1,033,447.

Specification of Letters Patent.  Patented July 23, 1912.

Application filed February 8, 1912. Serial No. 676,232.

*To all whom it may concern:*

Be it known that I, HERBERT W. MOWER, a citizen of the United States, residing in Newark, in the county of Essex and State of New Jersey, have invented certain new and useful Improvements in Expansion-Bolts, of which the following is a specification.

The object of this invention is to provide an improved form of expansion bolt, or improved form of shield and nut member for the structure, whereby the two sections of the shield member are retained in position for insertion in the hole by an integral connection, thereby obviating the use of an additional member besides the usual bolt and nut member.

A further object is to provide such structure whereby it can be readily formed by casting, such as of malleable iron, and easily bent to the desired form by suitable means, such as dies, without undue strain on the connecting part.

A further object of the invention is to provide an end wall for engaging the extremity of the bolt across practically the entire face, so that the thread will not be mutilated when the bolt engages this end portion to advance the nut member.

A further object is to provide an improved arrangement of the inclined or wedge-like walls of the two sections for engagement with the usual conical or tapering nut member.

Another object is to provide an arrangement of the shield sections, and also of the nut member, whereby the sections are expanded at both ends, or at different portions, by the same movement of the nut member.

In the accompanying drawings representing embodiments of my invention, Figure 1 is a longitudinal section through the device expanded in the opening in the wall. Fig. 2 shows a side elevation of the structure as placed in the wall and before the bolt has drawn the nut back to expand the sleeves. Fig. 3 is an elevation of the parts in the position shown in Fig. 1. Fig. 4 is a plan view of the shield member as cast, or before being bent up to the cylindrical position. Fig. 5 is a view of the larger end of the nut member. Fig. 6 is a longitudinal section through the nut member, and Fig. 7 is a view of the smaller end of the nut member. Fig. 8 is an inner end view of the shield member shown in Fig. 4, and Fig. 9 is an outer end view of the same. Fig. 10 is a longitudinal section through a modification, and Fig. 11 shows the shield member used in the construction shown in Fig. 10.

The shield member 15 is somewhat of the usual construction comprising a sleeve formed in two sections cut on a longitudinal axial plane, that when brought together form a tube to be expanded by a tapering nut member. Heretofore, these two sections were held together by suitable means, such as a split ring or the like to retain them for insertion into the aperture, yet which would permit them to expand by the nut member. To obviate the use of an additional member for holding the parts together, I provide an integral connection in the form of a strip 16, that in Fig. 4 is shown at the outer end of the sections. And this strip extends from a place 17 intermediate of the longitudinal edges of the section A, to a place 18 intermediate of the longitudinal edges of the section B, slots 19 and 21 separating the strip 16 on its side edge from the adjacent portions of the sections. This structure is preferably formed by casting, or else by dies, with the two sections A and B lying with their longitudinal edges in one plane, and the strip 16 extending in a plane parallel therewith, as shown in Figs. 8 and 9. Such arrangement can be very readily formed by the usual method of casting. Then the two sections are brought together by curving the strip 16, that will follow a cylindrical contour of the shells as brought together, and form a substantially cylindrical member. Were the two sections connected directly at their adjacent longitudinal edges, such strip would be very short, and would have to be given such a very sharp bend that it would very likely break. But the great advantages of this strip 16 extending from the intermediate portions of the sections, is that the sections can separate readily on both sides at the longitudinal edges.

The two sections, A and B, are formed with their inner walls at some portion made tapering, or conical, to engage a conical nut 21 which is preferably beyond the strip 16, and best located at the opposite end. The usual form of bolt 22 will draw the nut 20 outward against such tapered walls and cause expansion of the shield sections in the usual manner, that will be freely permitted by reason of the connecting strip 16 extending from the intermediate or opposite portions of the shield.

In order to form a stop for the end of the bolt, I provide one of the sections, as A, with an end wall 23 extending across the axis of the shield member. In order that the strain on this end wall may be also taken by the other section B, I provide an end wall 24 to this section that engages the outer face of the said wall 23, the wall 24 extending only to the side edges of these sections, and located outside of the wall 23 when they are brought together. The said tapered walls of the sections are shown in one form as arranged at this end, and I also provide in each section, preferably when cast, openings, as 25 and 26, at the intermediate or bottom portion of each section. And the wall of the section is formed tapering from the intermediate portion to this opening, as clearly shown in Figs. 1 and 10, to engage the correspondingly tapered portion of the wedge member or nut 20. By having the two end walls, 23 and 24, the use of the openings 25 and 26 does not weaken the structure so as to render it inoperative.

The nut member 20 is preferably formed oval or elliptical in section, as shown in Figs. 5 and 7. This nut member is inserted between the two sections A and B adjacent the end wall 23, before the parts are brought together by bending the strip 16. After such operation the nut member will be securely held inside of the shield, and prevented from being displaced and lost, and ready for the insertion of the usual bolt 22.

When the parts are together, as shown in Fig. 2, it will be seen that the side edges of the shield sections are in close proximity at the inner end, but apart about ⅛ of an inch at the outer end. But when inserted in the hole in the wall, that is made about the size of the inner end of the shield, the section will be forced together at the outer end and will tightly grip the walls of the hole in the wall. Upon turning the bolt, the nut will be drawn outward and the sleeve sections forced apart thereby and into locking engagement with the walls of the opening. The angle of the nut and also of the tapered walls in the sections, will cause a practically radially outward movement of the sections, and the outer walls will remain substantially parallel. During this movement the end of the bolt will engage the end wall 23, and prevent inward movement of the bolt when it starts. At the same time, since this wall extends entirely across the end of the bolt, it will not tend to strip the threads or injure the bolt, providing for the easy removal of the bolt when desired.

If desired, the wedge member or nut may be duplicated at another part of the shield. Heretofore a pair of wedge members have been employed but they have operated by movement in opposite directions. As shown, I provide a pair of nut or wedge portions at different parts of the shield that operate in the same direction of endwise movement. As shown in Fig. 10, I provide a double nut or wedge member having a conical portion 30 at one end corresponding to the nut member 20, and at another portion a similar wedge member 31; these members preferably being connected by an integral sleeve 32.

The sections 33 and 34 are provided with tapered wall portions 35 and 36 to engage with the said wedge member. Preferably the sections may have openings at 37 and 38, corresponding with the said openings 25 and 26 at the end of the tapered wall in Fig. 4. From this construction it will be seen that when the bolt is turned the inner wedge member 30 that is threaded to engage the bolt is forced outward and will expand the sections in the usual manner. But the wedge part 31, if integral with the part 30, will move in the same direction and will therefore expand the outer portion of the sections. But if preferred, the connecting sleeve 32 can be a separate member from the wedge portions 30 and 31, and merely contact therewith. Yet it will be understood that if the wedge or nut portion 30 is drawn outward by the bolt, the sleeve will be advanced and move the wedge portion 31 in the same direction, and expand the sections. Preferably these sections 33 and 34 are constructed with an integral connecting strip like the strip 16. But with the double wedge member this strip is preferably arranged at the middle portion, as shown in Fig. 11, where the sections C and D have an integrally connecting strip 40 extending from the intermediate portions of the two sections. These sections are provided with the end walls 41 and 42 similar to the walls 23 and 24 in Fig. 4, and also provided with the openings 37 and 38 adjacent tapered portions 35 and 36 for engagement with the nut member 30. These sections may also be provided with openings 49 and 50 adjacent tapered portions 47 and 48 for engagement with the wedge portion 31 at the intermediate portion of the shield. This latter structure possesses all of the advantages of simplicity that the other one does, as the construction of the shield member is practically the same, and the wedge or nut member is simply an elongated sleeve, or the same form of nut member provided with the additional wedge member and a connecting sleeve. But obviously this form of double wedge member can be used without the integral connecting strip, and the sections held together by the usual split ring or other means.

Having thus described my invention, I claim:—

1. A shield member for expansion bolts comprising a pair of sections having an integral connecting strip extending from each section at a place intermediate of the longitudinal edges of each section and free from the longitudinal edges whereby both coöperating edges are free to separate upon expansion of the shield.

2. A shield member for expansion bolts comprising a pair of sections having an integral connecting strip extending from each section at a place intermediate of the longitudinal edges of each section and alining with the cylindrical contour of the shell, whereby the sections are retained together and both coöperating pairs of the longitudinal edges are entirely free to separate upon expansion of the shield.

3. A shield member for expansion bolts comprising a pair of sections having an integral connecting strip extending from each section at a place intermediate of the longitudinal edges of each section, whereby the sections are retained together and both pairs of the longitudinal edges are entirely free to separate upon expansion of the shield, one of the sections having an integral circular portion arranged to close one end of the shield.

4. A shield member for expansion bolts comprising a pair of sections having an integral connecting strip extending from a place intermediate of the longitudinal edges of each section, whereby the sections are retained together and the longitudinal edges are entirely free to separate upon expansion of the shield, one of the sections having an integral disk portion arranged to close one end of the shield, and a transverse wall carried by the other section and engaged by the outer wall of the disk on the said section.

5. A shield member for expansion bolts comprising a pair of sections, means for holding the sections together, one of the sections having an integral disk portion arranged to close one end of the shield, and a transverse wall carried by the other section and engaged by the outer wall of the disk on the said section.

6. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member.

7. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member, the sections having openings at an intermediate portion and also having the side walls formed tapering toward said latter openings in the same direction that said other walls are tapered, to cause expansion of this part of the shield from another wedge portion moving in the same direction as said wedge portion.

8. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member, the sections having openings at an intermediate portion and also having the side walls formed tapering toward said latter openings in the same direction that said other walls are tapered, to cause expansion of this part of the shield from another wedge portion moving in the same direction as said wedge portion, said wedge portions being connected for simultaneous movement.

9. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member, the sections having openings at an intermediate portion and also having the side walls formed tapering toward said latter openings in the same direction that said other walls are tapered, to cause expansion of this part of the shield from another wedge portion moving in the same direction as said wedge portion, said wedge portions being connected for simultaneous movement, said two wedge portions being formed integral.

10. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member, the sections having openings at an intermediate portion and also having the side walls formed tapering toward said latter openings in the same direction that said other walls are tapered, to cause expansion of this part of the shield from another wedge portion moving in the same direction as said wedge portion, the sections having an integral connecting strip extending from a place intermediate from the longitudinal edges of each section, whereby such edges are free to separate upon expansion of the shield by the nut members.

11. A shield member for expansion bolts comprising a pair of sections, each having an end wall and also an opening in the side adjacent the end wall, the said wall of each section being made tapering from the intermediate part of the section to the edge of said opening to constitute opposed inclined walls, to cause expansion of the sections from a wedge member, the sections having openings at an intermediate portion and also having the side walls formed tapering toward said latter openings in the same direction that said other walls are tapered, to cause expansion of this part of the shield from another wedge portion moving in the same direction as said wedge portion, the sections having an integral connecting strip extending from a place intermediate from the longitudinal edges of each section, whereby such edges are free to separate upon expansion of the shield by the nut members, said strip being located intermediate of the said wedge engaging portions of the sections.

12. An expansion bolt comprising a shield formed of a pair of sections, a threaded bolt member, and a nut member having two conical portions tapered in the same direction, the shield member having tapered portions corresponding with the conical portions of the nut member whereby movement of the nut member by the bolt will cause expansion of the portions of the shield engaged by the nut members in the same direction.

13. An expansion bolt comprising a shield formed of a pair of sections, a threaded bolt member, and a nut member having two conical portions tapered in the same direction, the shield member having tapered portions corresponding with the conical portions of the nut member whereby movement of the nut member by the bolt will cause expansion of the portions of the shield engaged by the nut members in the same direction, one of these sections of the shield having a transverse wall at the end extending across the inner end of the bolt.

14. An expansion bolt comprising a shield formed of a pair of sections, a threaded bolt member, and a nut member having two conical portions tapered in the same direction, the shield member having tapered portions corresponding with the conical portions of the nut member whereby movement of the nut member by the bolt will cause expansion of the portions of the shield engaged by the nut members in the same direction, one of these sections of the shield having a transverse wall at the end extending across the inner end of the bolt, the other of the sections having an end wall engaging the outer face of said transverse wall.

15. An expansion bolt comprising a shield formed of a pair of sections, a threaded bolt member, and a nut member having two conical portions tapered in the same direction, the shield member having tapered portions corresponding with the conical portions of the nut member whereby movement of the nut member by the bolt will cause expansion of the portions of the shield engaged by the nut members in the same direction, one of these sections of the shield having a transverse wall at the end extending across the inner end of the bolt, the other of the sections having an end wall engaging the outer face of said transverse wall, the sections having an integral connecting strip extending from the place intermediate of the longitudinal edge of each of the sections, whereby such edges are free to separate upon expansion of the shield.

HERBERT W. MOWER.

Witnesses:
  WILLIAM H. REID,
  FRED J. DOLE.